United States Patent [19]
Kitzner et al.

[11] 3,724,286
[45] Apr. 3, 1973

[54] ENERGY ABSORBING STEERING COLUMN ASSEMBLY

[75] Inventors: Ernest W. Kitzner, Allen Park; Alex Rhodes, Detroit; James Rose, Saint Clair Shores, all of Mich.

[73] Assignee: Ford Motor Company, Dearborn, Mich.

[22] Filed: Nov. 22, 1971

[21] Appl. No.: 200,962

Related U.S. Application Data

[63] Continuation of Ser. No. 863,137, Oct. 2, 1969, abandoned.

[52] U.S. Cl. ................................................74/492
[51] Int. Cl. .............................................B62d 1/18
[58] Field of Search ..................74/492, 493; 188/1 C

[56] References Cited

UNITED STATES PATENTS

| | | | |
|---|---|---|---|
| 3,392,599 | 7/1968 | White | 74/492 |
| 3,394,612 | 7/1968 | Bogosoff et al. | 74/492 |
| 3,459,063 | 8/1969 | Numazawa | 74/492 |
| 3,482,653 | 12/1969 | Maki et al. | 188/1 C |

Primary Examiner—Milton Kaufman
Attorney—John R. Faulkner et al.

[57] ABSTRACT

An energy absorbing steering column having an outer tube secured to vehicle support structure. The tube rotatably supports a steering shaft which has a steering wheel connected to its upper end and a steering gear connected to its lower end. Spaced apart support members connect the column to the support structure. One support member includes metal deforming projections which engage the outer tube. The projections are constructed to plastically deform the tube upon axial displacement thereof and thereby absorb the energy of an impact upon the steering wheel. The other support member includes a bushing that permits axial displacement of the outer tube.

25 Claims, 6 Drawing Figures

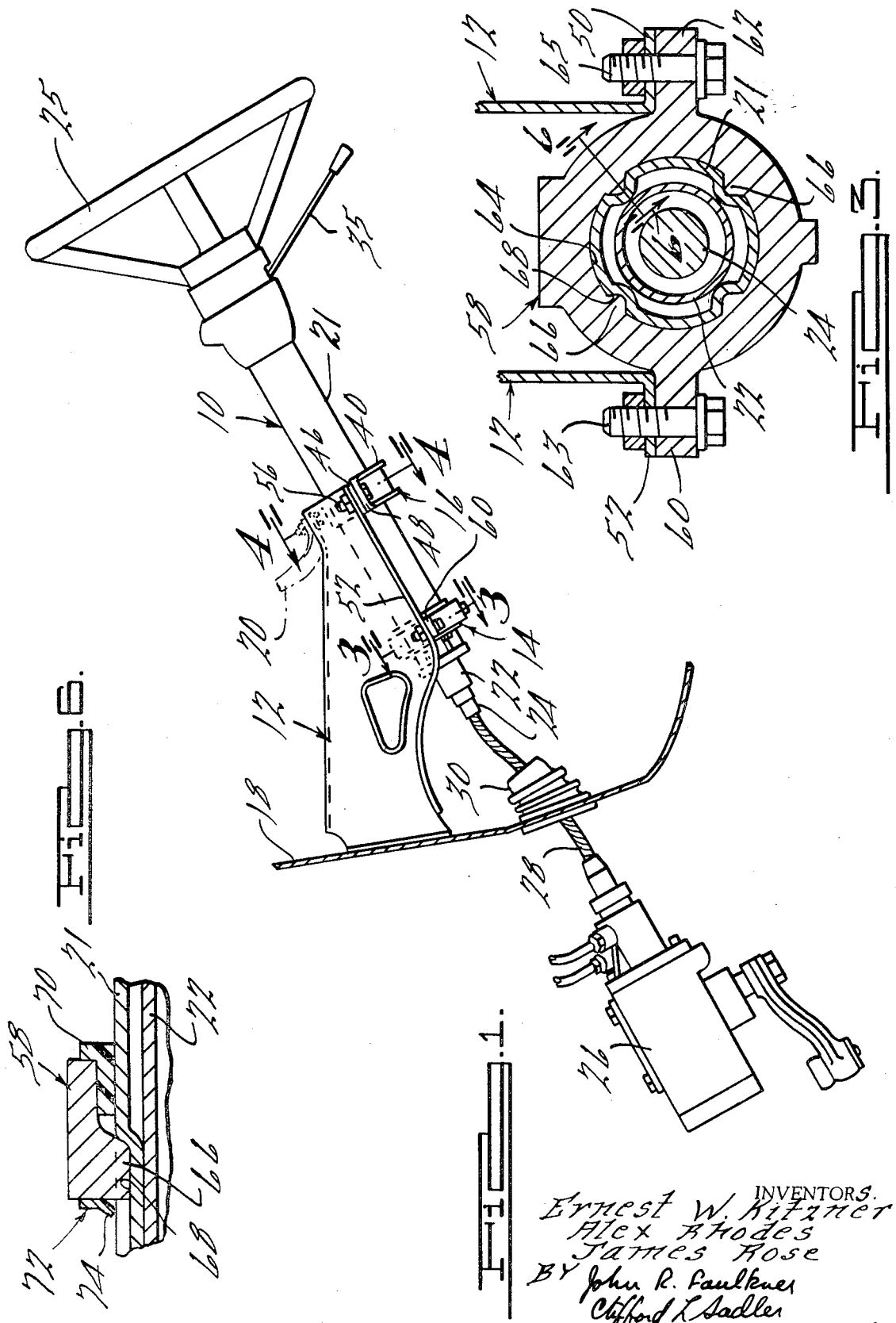

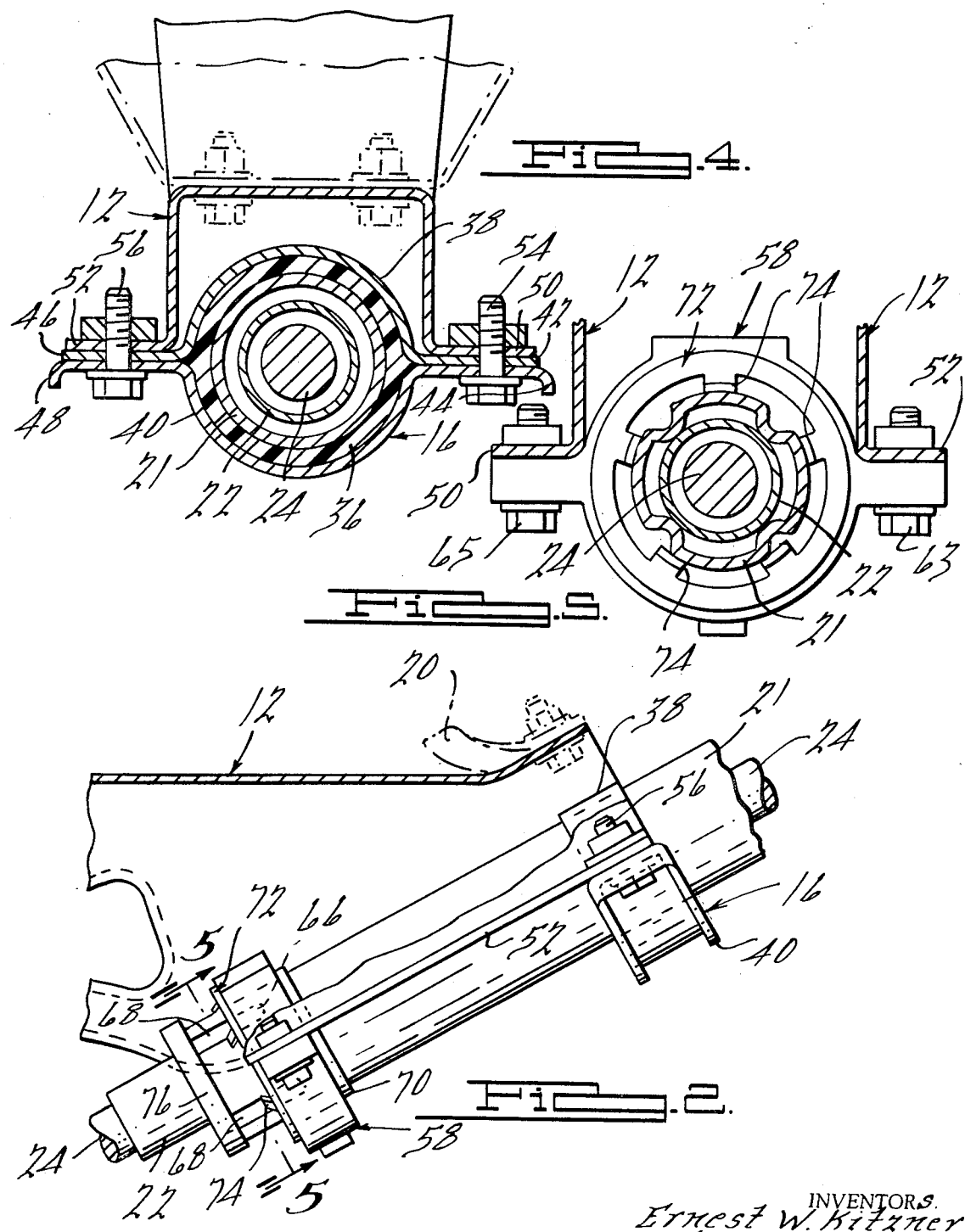

ENERGY ABSORBING STEERING COLUMN ASSEMBLY

This is a continuation of application Ser. No. 863,137, filed Oct. 2, 1969, now abandoned.

BACKGROUND OF THE INVENTION

The present invention is partially concerned with an energy absorbing steering column that is designed to plastically deform at a controlled rate in order to absorb an impact load upon the steering wheel. Certain prior art steering columns that deform under load to absorb energy are objectionable because they are expensive to manufacture due to their complexity of construction. The present invention performs the function of absorbing energy and is particularly characterized by its simplicity of construction and economy of manufacture.

BRIEF SUMMARY OF THE INVENTION

The present invention provides, in its preferred embodiment, an energy absorbing steering column assembly having an outer tube that is supported on the vehicle support structure by a pair of spaced apart support members. The upper support member has a bushing that permits sliding axial displacement of the outer tube. The lower support member includes a series of projections that extend radially inwardly into engagement with the tube.

The tube is constructed to support a rotatable steering shaft. The steering shaft has a steering wheel connected to its upper end and is connected to a steering gear at its lower end. When an impact load is imposed upon the steering wheel end of the steering column assembly, the outer tube is forced downwardly. The tube slides through the upper support, but is plastically deformed by the projections of the lower support. The inward projections plow grooves axially along the tube. The plastic deformation of the metal of the outer tube absorbs the energy of the impact. A steering column assembly in accordance with this invention is particularly economical to manufacture because the outer tube is fabricated of one-piece construction.

BRIEF DESCRIPTION OF THE DRAWINGS

The many objects and advantages of the present invention will become apparent upon consideration of the following detailed description and the accompanying drawings in which:

FIG. 1 is a side elevational view of a steering column assembly installed in a motor vehicle and constructed in accordance with this invention;

FIG. 2 is an enlarged side elevational view of a portion of the column assembly of FIG. 1;

FIG. 3 is a sectional view taken along section line 3—3 of FIG. 1;

FIG. 4 is a sectional view taken along section line 4—4 of FIG. 1;

FIG. 5 is a sectional view taken along section line 5—5 of FIG. 2; and

FIG. 6 is a sectional view taken along section line 6—6 of FIG. 3.

DETAILED DESCRIPTION OF THE PREFERRED EMBODIMENT

Reference is now made to the accompanying drawings and the following detailed description, for a complete disclosure of the presently preferred embodiment of this invention.

In FIG. 1 a steering column assembly 10 is secured to a support bracket 12 by means of a pair of spaced apart support assemblies 14 and 16. The support bracket 12 is secured to the fire wall 18 and the instrument panel 20 of a vehicle.

The support assemblies 14 and 16 are constructed to support a tube 21 which constitutes the outer housing of the steering column assembly. A transmission shift tube 22 is rotatably supported within the outer tube 21. A steering shaft 24, in turn, is rotatably supported within the shift tube 22.

The steering column assembly 10 includes a steering wheel 25 that is situated at the upper end of the steering column and is affixed to the steering shaft 24. The steering shaft 24 is connected at its lower end to a steering gear 26 by means of a flexible cable 28 that passes through an opening in the fire wall 18. A rubber boot is positioned about the cable 28 to seal the opening in the fire wall 18 against the passage of dust into the passenger compartment.

The shift tube 22 is connected to a gear shift selector lever 35 at its upper end and to the transmission shift linkage (not shown) at its lower end.

Reference is now made to FIG. 4 of the drawing, which discloses the construction of the upper steering column support structure 16. The figure discloses the steering shaft 24, the shift tube 22 and the outer tube 21 positioned in concentric relationship. A resilient bushing 36 of annular configuration is fitted about the outer tube 21. A pair of mating bracket members 38 and 40 are positioned together to locate the resilient bushing 36. The bracket members 38 and 40 have radially outwardly extending mating flanges 42 and 44 and mating flanges 46 and 48. The bracket 12 has a laterally extending flange 50 that is aligned with the flanges 42 and 44. Similarly, laterally extending flange 52 is in alignment with the flanges 46 and 48 of the bracket member 38 and 40. A bolt 54 secures the flanges 42, 44 and 50 together, and similarly a bolt 56 secures the flanges 46, 48 and 52 together.

The resilient collar or bushing 36 surrounds the outer tube 21 that is held in position by the brackets 38 and 40. This prevents rattling and isolates noise and vibrations. The bushing 36 is designed to permit sliding axial displacement of the tube 21 with only nominal resistance.

The support structure 14 adjacent the lower end of the outer tube 21 is illustrated in FIG. 3 in cross section. The outer tube 21 is surrounded by a rigid heavy collar or bracket 58 that has laterally extending arms 60 and 62. Arm 60 is connected to the flange 52 of the bracket 12 by means of a bolt and nut assembly 63. Similarly, a bolt 65 secures the arm 62 to the flange 50 of the bracket assembly 12.

The bracket 58 is of annular configuration and provided with a central opening 64 having a diameter only slightly greater than the outside diameter of the tube 21. Four circumferentially spaced apart inwardly directed projections 66 are provided on the interior surface of the opening 64. The lower end of the tube 21 is provided with a series of four circumferentially spaced apart axially extending grooves 68 in which the projections 66 are positioned.

An annular plastic bushing 70 having a generally L-shaped cross sectional configuration is fitted about the upper end of the annular bracket 58 as seen in FIG. 6. The bushing 70 slideably engages the exterior of the tube 21. A lock washer 72 is fitted about the tube 21 at its lower end adjacent to the bracket 58. A seen in FIGS. 2, 5 and 6, the washer or collar 72 has radially inwardly direct teeth 74 that bite into the exterior surface of the tube 21. The collar 72 serves to maintain the tube 21 of the steering column assembly 10 from moving upwardly with respect to the bracket assembly 14 during normal operation.

A bearing 76 is connected to the lower end of the tube 21, which rotatably supports the shift tube 22.

OPERATION

During normal operation the steering wheel 25 functions through the steering shaft 24 and flexible cable 28 to operate the steering gear 26. Column assembly 10 is maintained in position by the engagement of the tube 21 with the bracket assemblies 14 and 16. The grooves 68 extend a short axial distance from the lower end of the tube 21 and the projections 66 of the collar or bracket 58 are seated in the grooves 68 adjacent to their upper axial limit. This prevents displacement of the tube 21 downwardly during normal operation. Similarly, the biting action of the teeth 74 of the collar 72 prevents upward displacement of the tube 21. As noted in FIGS. 2 and 6 the collar 74 is positioned against the bracket 58.

In the event a substantial impact load is imposed upon the steering wheel 25 in a left-hand direction as viewed in FIG. 1, the column assembly 10 will tend to move downwardly and forwardly through the support assemblies 14 and 16. Due to the presence of the resilient bushing 36, support bracket 16 will provide little resistance to such displacement. Forward axial displacement of the steering column 10 will be resisted, however, by the bracket 14. The inwardly extending projections 66 will plow grooves along the surface of the tube 21 as assembly 10 moves forwardly. The new grooves will appear as extensions of the preformed grooves 68. This plastic deformation of the outer tube 21 will resist displacement of the column assembly 10 and the energy of the impact will be absorbed.

The bushing 70 on the annular bracket 58 (see FIG. 6) permits the tube 21 to pass through the bracket 58 without binding if the tube 21 should become askew due to the impact. The bushing 70 permits the projections 66 to perform their function if the tube should be angularly displaced as well as axially.

In the event an impact should be imposed upon the steering gear 26 that will cause its rearward displacement, the cable 28 will flex. Flexing of the cable 28 will prevent the steering shaft 24 from being displaced rearwardly into the passenger compartment of the vehicle.

It is particularly noteworthy that the outer tube 21 terminates adjacent to the lower bracket 14. The lower end of the tube 21 is spaced a substantial distance from the fire walls 18. Unlike conventional prior art structures, the tube 21 does not extend through the fire wall 18. With this structure, substantial deformation of the fire wall 18 can occur in a rearward direction without encountering the steering column.

The present invention provides a superior energy absorbing steering column. The column is characterized by its simplicity in that the plowing of grooves by the inwardly extending projections 66 effectively absorbs the energy of impact. In addition, the abbreviated length of the column adds toward the economy of manufacture.

The foregoing description presents the presently preferred embodiment of this invention. Modifications and alterations may occur to those skilled in the art which will come within the scope and spirit of the invention.

We claim:

1. An energy absorbing steering column assembly for a motor vehicle comprising a support structure including a bracket disposed rearwardly of a fire wall, a tube operatively connected to said bracket, said tube having its forward terminus spaced rearwardly of said fire wall, a steering shaft rotatably supported within said tube, said shaft being adapted to be connected to a steering wheel at its rearward end and to a steering gear at its forward end, a first support member and a second support member connecting said tube to said bracket, said first support member having deforming means engaging said tube, said second support member having means releasably engaging said tube and constructed to permit axial displacement of said tube relative to said bracket in response to the force of an impact load above a preset value, means connecting said first support member to said bracket and constructed to secure said first support member against any significant displacement relative to said bracket when subjected to an impact load substantially above said preset value, said second support member being connected to said bracket, said first and second support members being axially spaced apart, said tube having surface recesses, said deforming means being seated in said recesses, said deforming means being constructed to plastically deform said tube upon relative axial displacement of said tube with respect to said first support member.

2. An energy absorbing steering column assembly according to claim 1 and including:
    said deforming means comprising a plurality of circumferentially spaced apart inwardly directed projections.

3. An energy absorbing steering column assembly according to claim 1 and including:
    said recesses comprising axially extending elongated grooves, said deforming means being seated in said grooves.

4. An energy absorbing steering column assembly according to claim 1 and including:
    said deforming means comprising a plurality of circumferentially spaced apart inwardly directed projections, said recesses comprising axially extending elongated grooves, said projections being seated in said grooves.

5. An energy absorbing steering column assembly for a motor vehicle comprising a support structure, an outer tube connected to said support structure, a steering shaft rotatably supported within said outer tube, said shaft being adapted to be connected to a steering wheel at its upper end and to a steering gear at its lower end, a first support member having deforming means engaging said tube, said first member being connected to said support structure, a second support member having bushing means engaging said tube, said second support member being connected to said support structure, said first and second members being axially spaced apart, said outer tube having surface recesses, said deforming means being seated in said recesses, said deforming means being constructed to plastically deform said outer tube upon relative axial displacement of said outer tube with respect to said first support member, said deforming means comprising a plurality of circumferentially spaced apart inwardly directed projections, said recesses comprising axially extending elongated grooves, said projections being seated in said grooves, said first support means having bushing means engaging said outer tube.

6. An energy absorbing steering column assembly for a motor vehicle comprising a fire wall, a support bracket connected to said fire wall, a steering column outer tube connected to said support bracket, a steering shaft rotatably supported within said outer tube, said steering shaft being connected to a steering wheel at its upper end, a steering gear positioned forwardly of said fire wall, a flexible cable connecting said steering shaft and said steering gear, said flexible cable extending through said fire wall, a support member having deforming means engaging said tube, said member being connected to said support bracket, said outer tube having one end positioned adjacent said steering wheel and the other end spaced rearwardly of said fire wall, said deforming means being constructed to plastically deform said outer tube upon relative axial displacement of said outer tube with respect to said support member.

7. An energy absorbing steering column assembly for a motor vehicle according to claim 6 and including:
a second support member engaging said outer tube, said second support member being connected to said support bracket, said second support member being constructed to provide only nominal resistance to the axial displacement of said outer tube.

8. An energy absorbing steering column assembly for a motor vehicle comprising a support structure including a fire wall and a bracket disposed rearwardly of said fire wall, a tube operatively connected to said bracket, a steering shaft rotatably supported within said tube, said shaft being adapted to be connected to a steering wheel at its rearward end and to a steering gear at its forward end, a member having deforming means engaging said tube, the forward terminus of said tube being spaced apart from said member in a forward direction, releasable means connected to said bracket and releasably engaging said tube, said releasable means being constructed to permit axial displacement of said tube in response to the force of an impact load above a preset value, means connecting said member to said bracket and constructed to secure said member against any significant displacement relative to said bracket when subjected to an impact load substantially above said preset value, said releasable means and said member being axially spaced apart, said deforming means being constructed to plastically deform said tube upon relative axial displacement of said tube with respect to said member.

9. An energy absorbing steering column assembly according to claim 8 and including:
said member comprising a rigid collar encircling said tube.

10. An energy absorbing steering column assembly according to claim 8 and including:
lock means interposed between said member and said tube, said lock means being constructed to prevent the rearward displacement of said tube.

11. An energy absorbing steering column assembly according to claim 8 and including:
said member comprising a rigid collar encircling said tube, lock means interposed between said rigid collar and said tube, said lock means being constructed to prevent the rearward displacement of said tube relative to said collar.

12. An energy absorbing steering column assembly according to claim 8 and including:
said member comprising a rigid collar encircling said tube, said tube having surface recesses, said deforming means being seated in said recesses, lock means interposed between said rigid collar and said tube, said lock means being constructed to prevent the rearward displacement of said tube.

13. An energy absorbing steering column assembly for a motor vehicle comprising a fire wall, a support structure situated rearwardly of said fire wall, means connecting said support structure to said fire wall, an outer steering column tube having its forward terminus spaced rearwardly of said fire wall, a member and a releasable means connecting said tube to said support structure, said member and said releasable means being axially spaced apart and spaced rearwardly of said fire wall, a steering shaft rotatably supported within said outer tube, said shaft being adapted to be connected to a steering wheel at its rearward end and to a steering gear at its forward end, said member having deforming means engaging said outer tube, said forward terminus of said outer tube being situated forwardly of said member, said releasable means releasably engaging said outer tube and constructed to permit axial displacement of said outer tube relative to said support structure in response to the force of an impact load above a preset value, means connecting said member to said support structure and constructed to secure said member against any significant displacement relative to said support structure when subjected to an impact load substantially above said preset value, said deforming means being constructed to plastically deform said tube upon relative axial displacement of said tube with respect to said member.

14. An energy absorbing steering column assembly according to claim 13 and including:
said member comprising a rigid collar encircling said tube.

15. An energy absorbing steering column assembly according to claim 13 and including:
said member comprising a rigid collar encircling said tube, lock means interposed between said rigid collar and said tube, said lock means being constructed to prevent the rearward displacement of said tube.

16. An energy absorbing steering column assembly according to claim 13 and including:
lock means interposed between said member and said tube, said lock means being constructed to prevent the rearward displacement of said tube.

17. An energy absorbing steering column assembly according to claim 13 and including:
said member comprising a rigid collar encircling said tube, said tube having surface recesses, said deforming means being seated in said recesses, lock means interposed between said rigid collar and said tube, said lock means being constructed to prevent the rearward displacement of said tube.

18. An energy absorbing steering column assembly for a motor vehicle comprising a support structure including a fire wall and a support bracket means, said support bracket means being disposed rearwardly of said fire wall, an outer steering column tube connected to said support bracket means, a steering shaft rotatably supported within said outer tube, said shaft being adapted to be connected to a steering wheel at its rearward end and to a steering gear at its forward end, a rigid collar and means connecting said rigid collar to said support bracket means, said rigid collar having deforming means engaging the outer tube, said forward terminus of said outer tube being spaced apart from said rigid collar in a forward direction, releasable means connected to said support bracket means and releasably engaging said tube, said releasable means being constructed to permit axial displacement of said outer tube relative to said support bracket means in response to the force of an impact load above a preset value, the means connecting said rigid collar to said support bracket means being constructed to secure said collar against any significant displacement relative to said support bracket means when subjected to an impact load substantially above said preset value, said releasable means and said rigid collar being axially spaced apart and spaced rearwardly of said fire wall, said outer tube having surface recesses, said deforming means being constructed to plastically deform said outer tube upon relative axial displacement of said outer tube with respect to said rigid collar.

19. An energy absorbing steering column assembly according to claim 18 and including:
lock means interposed between said rigid collar and said tube, said lock means being constructed to prevent the rearward displacement of said tube.

20. An energy absorbing steering column assembly for a motor vehicle according to claim 1 and including:
said second support means having guide means constructed to slidably support said tube and to maintain said tube in alignment with said deforming means upon axial displacement thereof.

21. An energy absorbing steering column assembly for a motor vehicle according to claim 8 and including:
said releasable means being constructed to slidably support said tube and to maintain said tube in alignment with said deforming means upon said axial displacement thereof.

22. An energy absorbing steering column assembly for a motor vehicle according to claim 13 and including:
said releasable means being constructed to slidably support said tube and to maintain said tube in alignment with said deforming means upon axial displacement thereof.

23. An energy absorbing steering column assembly for a motor vehicle comprising a support structure including a fire wall, a normally stationary outer tube connected to said support structure, a steering shaft rotatably supported within said outer tube, said shaft being adapted to be connected to a steering wheel at its rearward end and to a steering gear at its forward end, a first support member having deforming means engaging said outer tube, a second support member having guide means engaging said outer tube, means rigidly securing said first and second support members to said support structure, said first and second support members being axially spaced apart and spaced rearwardly of said fire wall, said guide means being constructed to permit axial displacement of said outer tube relative to said second support member in response to force above a preset value, said deforming means being constructed to plastically deform said outer tube upon axial displacement of said outer tube with respect to said first support member whereby energy is absorbed, said guide means being constructed to slidably support said outer tube and to maintain said outer tube in alignment with said deforming means upon axial displacement of said outer tube.

24. An energy absorbing steering column assembly for a motor vehicle according to claim 23 and including:
said stationary outer tube having its forward terminus spaced rearwardly of said fire wall and forwardly of said first support member.

25. An energy absorbing steering column assembly for a motor vehicle comprising a support structure including a bracket disposed rearwardly of a fire wall, a normally stationary outer tube connected to said bracket, a steering shaft rotatably supported within said outer tube, said shaft being adapted to be connected to a steering wheel at its rearward end and to a steering gear at its forward end, a first support member having deforming means engaging said outer tube, a second support member having guide means engaging said outer tube, means rigidly securing said first and second support members to said bracket, said first and second members being axially spaced apart and spaced rearwardly of said fire wall, said outer tube having its forward terminus spaced rearwardly of said fire wall and forwardly of said first support member, said guide means being constructed to permit axial displacement of said outer tube relative to said second support member in response to the force of an impact load above a preset value, said deforming means being constructed to plastically deform said outer tube upon relative displacement of said outer tube with respect to said first support member whereby energy is absorbed, said guide means being constructed to slidably support said tube and to maintain said outer tube in alignment with said deforming means upon axial displacement thereof through a distance approximately equal to the distance between said support members.

* * * * *